United States Patent [19]
Crouch

[11] Patent Number: 5,822,477
[45] Date of Patent: Oct. 13, 1998

[54] SCANNABLE SEMICONDUCTOR LIGHT-ACTIVATED REFLECTOR FOR USE AT MILLIMETER-WAVE FREQUENCIES

[75] Inventor: David D. Crouch, Corona, Calif.

[73] Assignee: Raytheon Company, Los Angeles, Calif.

[21] Appl. No.: 843,875

[22] Filed: Apr. 17, 1997

[51] Int. Cl.$^6$ ........................................ G02B 6/26
[52] U.S. Cl. ............................ 385/27; 385/115; 385/147; 257/429
[58] Field of Search ............................. 385/27, 115, 116, 385/120, 121, 147, 131, 129, 130, 132, 16, 17, 18; 257/432, 437, 429

*Primary Examiner*—Phan T. H. Palmer
*Attorney, Agent, or Firm*—Brian C. Downs; Leonard A. Alkov; Glenn H. Lenzen, Jr.

[57] ABSTRACT

A light-activated reflector having a plurality of coplanar arrays of parallel optical fibers that are each covered with a thin coating of a semiconductor material. Silicon, germanium, and indium antimonide, for example, along with other suitable materials, may be used as the coating of semiconductor material. The number and spacing of the coplanar arrays are determined by the shortest wavelength at which the reflector is to be operated. Electron-hole pairs are created in the coating of semiconductor material when it is illuminated by photons having energy greater than the band-gap energy of the semiconductor material. Light is injected into the optical fibers of a selected array. The injected light is absorbed and creates electron-hole pairs in the coating of semiconductor material, which modifies the permittivity of the coating. The absorbed light causes the coating to become reflective at millimeter wave frequencies. A collimated millimeter-wave beam incident on the light-activated coplanar array is reflected at an angle equal to the angle of incidence. The millimeter-wave beam may be steered to a different angle by appropriately activating light sources associated with a different array of optical fibers.

14 Claims, 2 Drawing Sheets

SCANNABLE SEMICONDUCTOR LIGHT-ACTIVATED REFLECTOR FOR USE AT MILLIMETER-WAVE FREQUENCIES

BACKGROUND

The present invention relates generally to reflectors and combiners, and more particularly, to a scannable semiconductor light-activated reflector for use at millimeter-wave frequencies.

Prior art relating to scannable millimeter-wave antennas fall into one of three categories, including phased arrays, stepped focal-plane arrays, and mechanically-scanned antennas. No electronically scanned antenna is known that can cover the entire millimeter-wave band (30–300 GHz), as does the present invention. In addition, while both phased arrays and stepped focal-plane arrays are electronically scanned, each makes use of specialized microwave components such as phase shifters and mixers that become very expensive at millimeter-wave frequencies, if they are available at all. Mechanically-steered antennas, on the other hand, are wideband devices but are limited by their own inertia to relatively low scan rates.

Accordingly, it is an objective of the present invention to provide for an improved scannable semiconductor light-activated reflector for use at millimeter-wave frequencies.

SUMMARY OF THE INVENTION

To meet the above and other objectives, the present invention provides for a scannable semiconductor light-activated reflector that comprises an electronically scannable reflector for use at millimeter-wave (30–300 GHz) frequencies. One novel feature of the present invention is its use of light to dynamically modify the electrodynamic properties of a thin layer of semiconductor material, making it highly reflective to incident millimeter-wave radiation when illuminated by light of the proper wavelength. The reflector is comprised of a predetermined number of coplanar arrays of parallel semiconductor-coated strands of optical fiber, with the surface normal to each plane pointing in a different direction.

When it is desired to steer an incident millimeter-wave beam in a specific direction, light is injected into one end of each of the optical fibers of an appropriate plane. As the light leaks out of the fiber and into the semiconductor coating, it is strongly absorbed as it creates electron-hole pairs that modify both the real and the imaginary parts of the permittivity, making it highly reflective at millimeter-wave frequencies for light of sufficient intensity. A coplanar array of such highly-reflective parallel channels acts as a reflector, reflecting an incident signal at an angle equal to the angle of incidence. The beam may be steered in a different direction simply by illuminating the ends of the fibers in the appropriate coplanar array. The scannable semiconductor light-activated reflector thus provides a low-cost, wideband means of electronically scanning a millimeter-wave beam.

The advantages of the semiconductor light-activated reflector are that it does not require millimeter-wave components such as a feed network, IF switches, or phase shifters. The present reflector exhibits high pointing accuracy which can be obtained through careful alignment of the fibers in each coplanar array. There are no physical limitations on the angular resolution, and there are practical limitations due the number of fiber channels that can reasonably be packed into a given volume. The present reflector has an extremely wide bandwidth. The bandwidth of a single reflector is limited only by the spacing between neighboring fibers. The present reflector is fault tolerant, in that the performance of the reflector degrades gracefully if one or more of its elements (light sources in particular) fail. The present invention may be used in automotive collision-avoidance radars and military applications that require rapid scanning of a millimeter-wave beam, at low cost, and with high reliability.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1A:
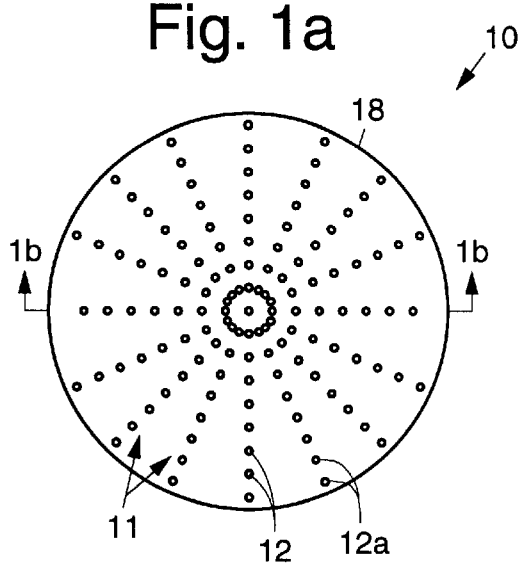
FIGS. 1a and 1b illustrate top and front views, respectively, of a scannable semiconductor light-activated reflector in accordance with the principles of the present invention.
Figure 1B:
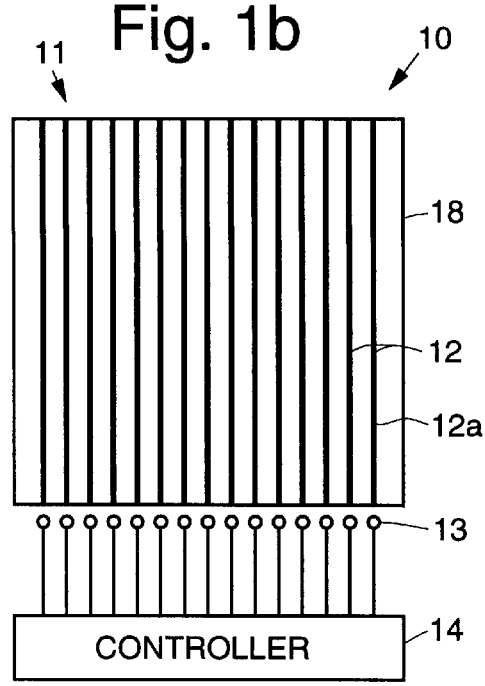

Referring to the drawing figures, Fig. 1a illustrates a top view of a scannable semiconductor light-activated reflector 10 in accordance with the principles of the present invention. FIG. 1b illustrates a side or front view of the reflector 10 of FIG. 1a, taken along the lines 1b—1b. More particularly, the components that comprise one possible implementation of the scannable semiconductor light-activated reflector 10 are shown in FIG. 1.

The reflector 10 includes a predetermined number of coplanar arrays 11 of parallel optical fibers 12 that are disposed in a housing 18 or enclosure 18. The number and spacing of the coplanar arrays 11 are determined by the shortest wavelength at which the reflector 10 is to be operated. The housing 18 or enclosure 18 is preferably cylindrical, because it minimizes reflections. In particular, reflections from the millimeter-wave source are directed back at the source and not into the desired field of view. Also, an antireflective coating may be applied to the surface of the cylindrical enclosure 18 to eliminate reflections. As the antireflective coating is designed to cancel reflections over only a narrow band of frequencies, however, this approach works only for narrow-band applications.

Each optical fiber 12 is covered with a relatively thin coating 12a of a semiconductor material. Silicon, germanium, and indium antimonide, for example, may be used as the coating 12a of semiconductor material. Electron-hole pairs are created in the coating 12a of semiconductor material when it is illuminated by photons having energy greater than the band-gap energy of the semiconductor material. Light is injected into each optical fiber 12 using a plurality of light sources 13 driven by a controller 14, for example. The injected light is absorbed as it creates electron-hole pairs in the coating 12a of semiconductor material, which modifies the real and imaginary parts of its complex permittivity. If enough light is absorbed by the coating 12a of semiconductor material, it becomes highly reflective at millimeter wave frequencies.

It is to be understood, however, that the present invention is not limited only to these semiconductor materials. The present invention envisions the use of any semiconductor material as the coating 12a whose permittivity may be modified as a result if injection of absorbed light. Furthermore, a preferred thickness of the coating 12a is on the order of a few microns. However, it is to be understood that other considerations, such a manufacturability, for example, may dictate that a thicker coating 12a, on the order of tens to hundreds of microns, be used.

Figure 2A:
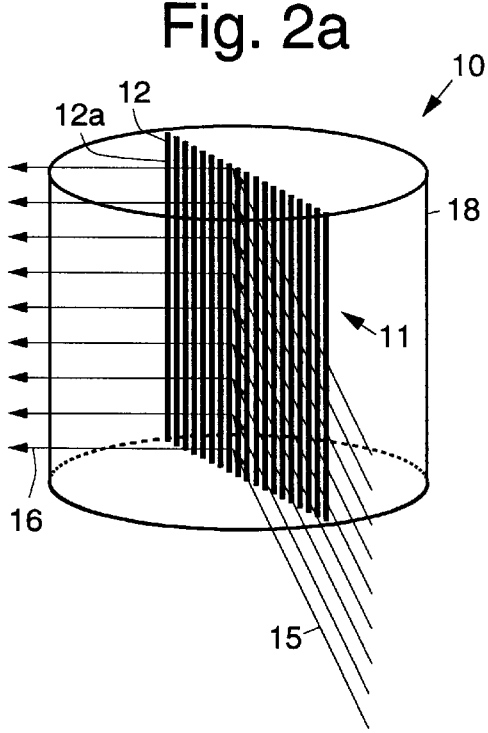
FIGS. 2a and 2b illustrate perspective views of scannable semiconductor light-activated reflectors depicted in FIG. 1 showing reflection of an incident millimeter-wave signal from a fixed source at two different scan angles, respectively.
Figure 2B:
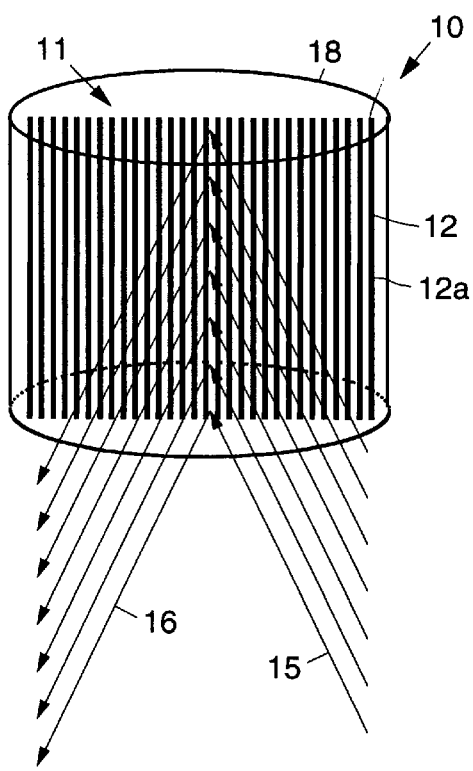

By injecting light into each of the optical fibers 12 in a coplanar array 11 by way of the light sources 13, the reflector 10 in accordance with the present invention is created. A collimated input millimeter-wave signal 15 or beam 15 incident on the light-activated coplanar array 11 of parallel optical fibers 12 is reflected at an angle equal to the angle of incidence, identified as output millimeter-wave signal 16 or beam 16 as is illustrated in FIGS. 2a and 2b. All that is necessary to steer the millimeter-wave beam to a different angle is to switch the light sources, turning off the sources illuminating the channel ends at the previous angle and turning on those illuminating the channel ends at the new angle.

A single semiconductor light-activated reflector 10 can scan a millimeter-wave beam 15 in one dimension only. Two-dimensional scanning capability is achieved in one of two ways. One can use a single semiconductor light-activated reflector 10, and feed it with millimeter wave energy provided by a conventional one-dimensional phased array, for example. Thus, the one-dimensional phased array may be used to scan the beam vertically while the scannable semiconductor light-activated reflector 10 is used to scan the beam horizontally. However, this approach requires the use of phase shifters, which are expensive or non-existent at millimeter-wave frequencies.

Figure 3:
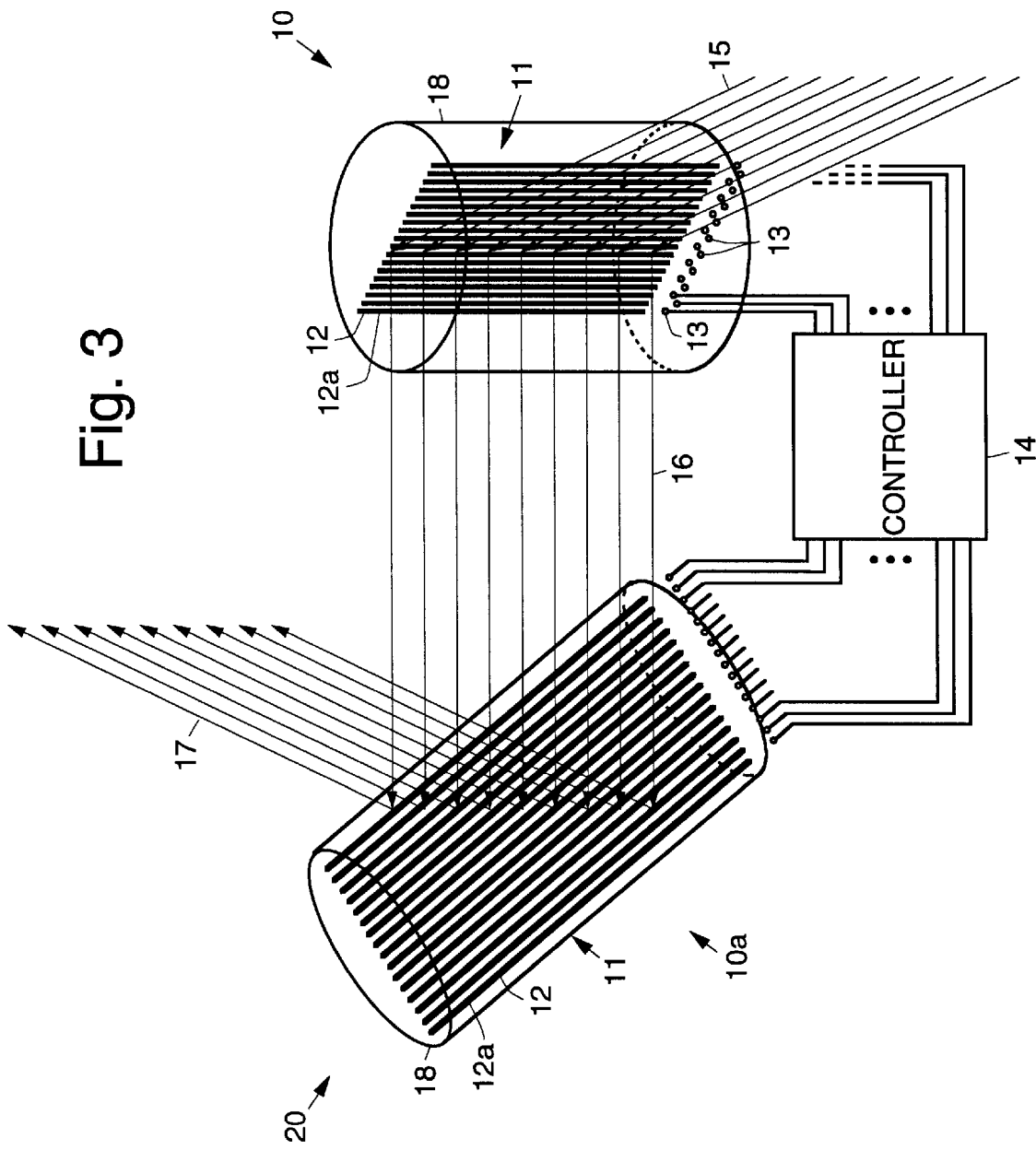
FIG. 3 illustrates tandem scannable semiconductor light-activated reflectors used to implement fully electronic two-dimensional scanning.

The other approach uses two semiconductor light-activated reflectors 10, 10a to achieve two-dimensional scanning capability. FIG. 3 illustrates tandem semiconductor light-activated reflectors 10, 10a used to implement fully electronic, two-dimensional scanning. In FIG. 3, one reflector 10 scans the input beam 15 horizontally, and the other reflector 10a scans the output beam from the first reflector 10 vertically, to produce a final output beam 17.

Thus, improved semiconductor light-activated reflectors have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Microwave apparatus for reflecting an input microwave beam at a plurality of different output angles, said apparatus comprising:

a semiconductor light-activated reflector comprising a predetermined number of arrays of coplanar parallel strands of optical fiber that are coated with a semiconductor coating, wherein a surface normal to each plane points in a different direction; and means for selectively injecting light into one end of each of the optical fibers in a selected array;

and wherein, light injected into the optical fibers of the selected array leaks out of each of the optical fibers and into the semiconductor coatings and is absorbed and creates electron-hole pairs that modify real and imaginary parts of the permittivity of the optical fibers in the selected array, making the array reflective at millimeter-wave frequencies so as to reflect an input microwave beam made incident thereon.

2. The apparatus of claim 1 wherein the number of arrays and spacing between the arrays are a function of the frequency at which the reflector is to be operated.

3. The apparatus of claim 1 wherein the coating of semiconductor material comprises silicon.

4. The apparatus of claim 1 wherein the coating of semiconductor material comprises germanium.

5. The apparatus of claim 1 wherein the coating of semiconductor material comprises indium antimonide.

6. The apparatus of claim 1 further comprising a second scannable semiconductor light-activated reflector comprising a predetermined number of arrays of coplanar parallel strands of optical fiber that are coated with a semiconductor coating, wherein a surface normal to each plane points in a different direction, and means for selectively injecting light into one end of each of the optical fibers in a selected array, and wherein said second scannable semiconductor light-activated reflector is oriented at a predetermined angle with respect to another semiconductor light-activated reflector.

7. The apparatus of claim 1 wherein the means for selectively injecting light comprises a plurality of light sources disposed to couple light into each of the optical fibers of the respective arrays, and a controller coupled to the plurality of light sources for selectively turning on the light sources for the selected array.

8. An electronically scannable reflector for use at millimeter-wave frequencies, comprising:

a plurality of arrays of coplanar parallel strands of optical fiber that are coated with a semiconductor coating that each has a surface normal that points in a different predetermined direction; and means for injecting light into one end of each of the optical fibers of a selected coplanar array, which light leaks out of each of the optical fibers and into the semiconductor coatings and is absorbed and creates electron-hole pairs that modify the permittivity of the optical fibers of the selected array to make the array reflective at millimeter-wave frequencies.

9. The reflector of claim 8 wherein the number of arrays and spacing between the arrays are a function of the frequency at which the reflector is to be operated.

10. The reflector of claim 8 wherein the coating of semiconductor material comprises silicon.

11. The reflector of claim 8 wherein the coating of semiconductor material comprises germanium.

12. The reflector of claim 8 wherein the coating of semiconductor material comprises indium antimonide.

13. The reflector of claim 8 further comprising a second scannable semiconductor light-activated reflector comprising a predetermined number of arrays of coplanar parallel strands of optical fiber that are coated with a semiconductor coating, wherein a surface normal to each plane points in a different direction, and means for selectively injecting light into one end of each of the optical fibers in a selected array, and wherein said second scannable semiconductor light-activated reflector is oriented at a predetermined angle with respect to said electronically scannable reflector.

14. The apparatus of claim 8 wherein the means for selectively injecting light comprises a plurality of light sources disposed to couple light into each of the optical fibers of the respective arrays, and a controller coupled to the plurality of light sources for selectively turning on the light sources for the selected array.

* * * * *